(12) United States Patent
Durham

(10) Patent No.: US 6,382,868 B1
(45) Date of Patent: May 7, 2002

(54) SLOT LOCK RING

(76) Inventor: Kevin Durham, 16603 Park Lorne, Houston, TX (US) 77084

( * ) Notice: Subject to any disclaimer, the term of this patent is extended or adjusted under 35 U.S.C. 154(b) by 0 days.

(21) Appl. No.: 09/625,482

(22) Filed: Jul. 25, 2000

(51) Int. Cl.[7] .................................................. F16B 2/04
(52) U.S. Cl. ............................ 403/371; 403/24; 166/368
(58) Field of Search .................................. 403/371, 297, 403/370, 24, 368, 367, 369, 374.1; 166/368; 285/321

(56) References Cited

U.S. PATENT DOCUMENTS

| | | | |
|---|---|---|---|
| 4,211,149 A | | 7/1980 | Hrusch ........................... 92/27 |
| 4,491,346 A | * | 1/1985 | Walker .......................... 285/18 |
| 4,714,111 A | * | 12/1987 | Brammer ................... 285/18 X |
| 5,066,048 A | * | 11/1991 | Farrell ........................... 285/18 |
| 5,127,478 A | * | 7/1992 | Miller .......................... 166/348 |
| 5,259,459 A | * | 11/1993 | Valka ........................... 166/345 |
| 5,433,274 A | * | 7/1995 | Graff et al. .................. 166/368 |
| 5,607,019 A | * | 3/1997 | Kent ............................ 166/344 |
| 5,655,603 A | * | 8/1997 | Schulte et al. ............... 166/368 |
| 5,695,297 A | * | 12/1997 | Geib ............................ 403/371 |

* cited by examiner

Primary Examiner—Harry C. Kim

(57) ABSTRACT

A slot lock ring assembly capable of repeated radial expansion and contraction without sustaining permanent deformation and expansion to a load bearing state comprising: a solid metal ring having a toothed profile on one diameter and a tapered actuating profile on the opposite diameter, a top edge and a bottom edge; a spaced group of cuts that allow repeated radial expansion and contraction of the solid metal ring without sustaining permanent deformation, wherein the cuts are made in an alternating pattern, of a first cut starting on the top edge followed by a second cut starting on the bottom edge, and each group of cuts is spaced apart 10 to 40 degrees.

9 Claims, 3 Drawing Sheets

SLOT LOCK RING

FIELD OF THE INVENTION

This invention relates in general to subsea wellhead equipment, and in particular to an apparatus used to remotely lock wellhead components together. The present invention insures repeated locking of a subsea wellhead system, or a subsea connector or other subsea tubular members without sustaining permanent deformation in the apparatus itself.

BACKGROUND

Tubing hangers and tree caps have members that can be secured with locking mechanisms known as split rings. While successful, split rings are known to permanently deform after a single expansion. The present invention relates to a radially expandable and contractible slot lock ring for subsea wellheads, tubing hangers, subsea Christmas trees, a tree caps, subsea connectors or any number of tubular members used in the subsea oil and gas industry. The slot ring is capable of sustaining incredible force due to pressure end loads after expansion yet is pliable enough to return to its original shape when retracted.

The present invention replaces the conventional split locking rings, such as taught in U.S. Pat. No. 4,211,149 and incorporated by reference herein. Typical split locking rings are not capable of great elasticity after an initial deformation. They are incapable of coming back to their original shape after being expanded to lock into its mating component.

The present invention utilizes a unique pattern of cuts, grouped in slots, at specific distances from each other, which enable the solid ring to be deformed and then contract without loosing shape. The slot lock ring is actuated by straight axial motion by a tubular actuator having an actuating profile that engages an angular profile on the slot lock ring opposite the locking teeth of the slot lock ring.

The present invention provides a unique solution, which improves the maintenance needs for subsea wellhead or subsea equipment.

DETAILED DESCRIPTION

Figure 1:
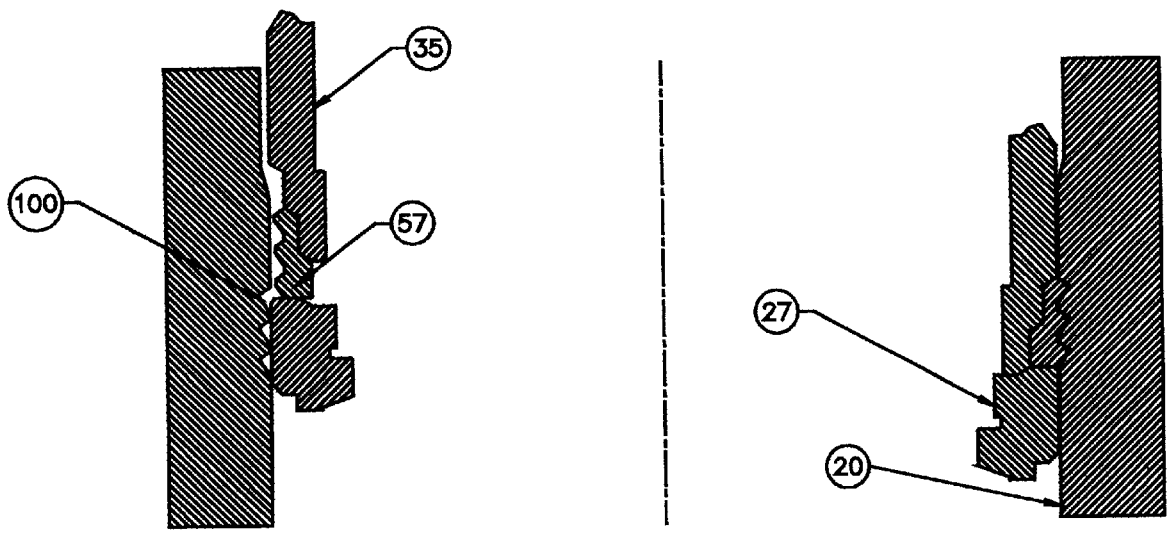
FIG. 1 is a cross sectional view of the slot lock ring when engaged on a spool tree for subsea well.

Referring now to the drawings and to FIG. 1 in particular, a tubing hanger running tool, (not shown) is used to connect to an actuator 35, which engages the slot lock ring assembly 57. The tubing hanger-running tool can exert a downward pressure on actuator 35 which in turn exerts radial force on the slot lock ring assembly. With the downward pressure, the slot ring assembly cams outwardly engaging the slot lock ring into grooves 100 located in the desired equipment to be locked, such as the tree spool 13 shown in FIG. 1. Other types of subsea apparatus can be locked with the slot lock ring, such as tubing connectors, tree caps, and piping of various sorts. The slot lock ring assembly 57 slidably engages a connector 27, which can be an actuating mandrel as shown in FIG. 1. Simple packing can also act as the connector 27. In the current embodiment, the actuating mandrel 27 is used to affect a seal against tree spool item 20.

Figure 2:
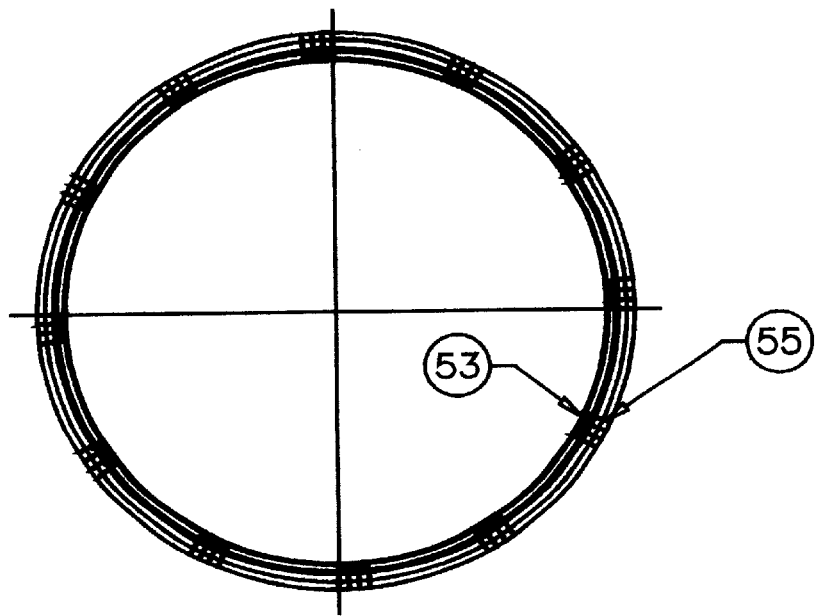
FIG. 2 is a top view of the slot lock ring assembly showing the groups of patterned of radial slots.

FIG. 2 shows a plurality of cuts 53 and 55 that are cut a distance into the cross section of the slot lock ring. The cuts are preferably rectangular in shape with defined depths and widths that enable the slot lock ring to return to its original shape after a single expansion. In one embodiment, the cuts have depths that range from one to two inches, with even more preferred embodiments having the cuts with depths that range from 1.5 to 1.9 inches, and the most preferred embodiment uses a cut depth 1.875 inches.

Figure 3:
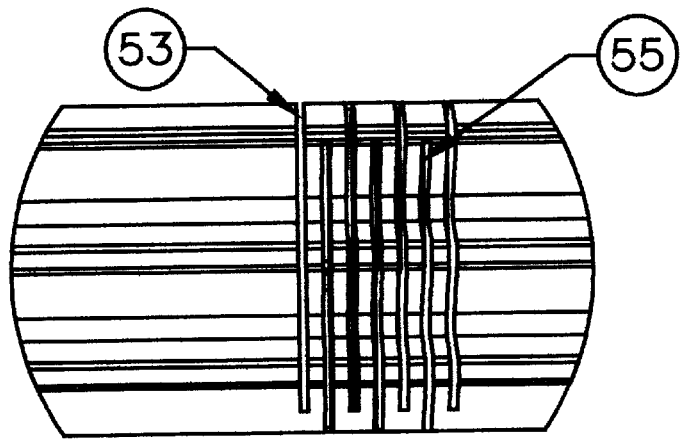
FIG. 3 is a side view of the slot lock ring having one particular pattern of alternating cuts disposed in the metal ring.
Figure 4:
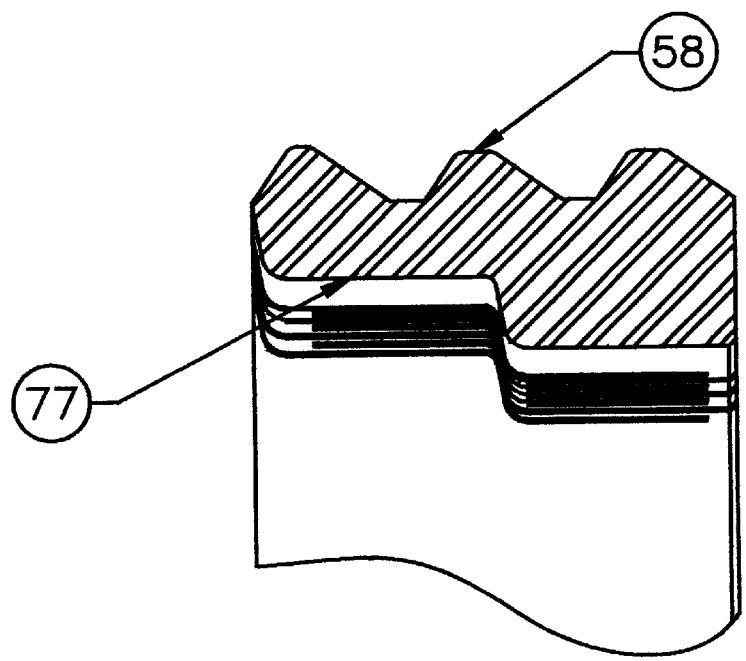
FIG. 4 is a detailed view of the slot lock ring toothed profile that engages the tree spool and the angular profile that engages the actuator disposed on either end.

In FIG. 3, cuts 53 and 55 are shown as having a width ranging from 0.025 to 0.130 inches. In a more preferred embodiment, the cuts have a width from 0.050 to 0.070 inches, and in the most preferred embodiment, the cuts have a width of 0.070 inches.

The pattern for the cuts 53 is most preferably in alternating cuts. In the most preferred embodiment, the pattern of cuts has a first cut from the top edge of the metal ring to just 0.125 of an inch from the bottom edge of the metal ring. The second cut is from the bottom edge of the metal ring to just 0.125 of an inch from the top edge. It is also contemplated that the cuts can be made such that two or three cuts originate from the top edge of the metal ring followed by two or three cuts originating from the bottom edge of the metal ring. The groups of cuts are termed "slots".

In a preferred embodiment, the inner diameter of the metal ring is tapered. The degree of tapering is approximately 20°.

The groups of cuts, sometimes called slots, are preferably spaced 30 degrees from each other in the most preferred embodiment. It is also contemplated that the groups of cuts can be spaced anywhere from 10 to 40 degrees apart and still be usable in the present invention.

Figure 5:
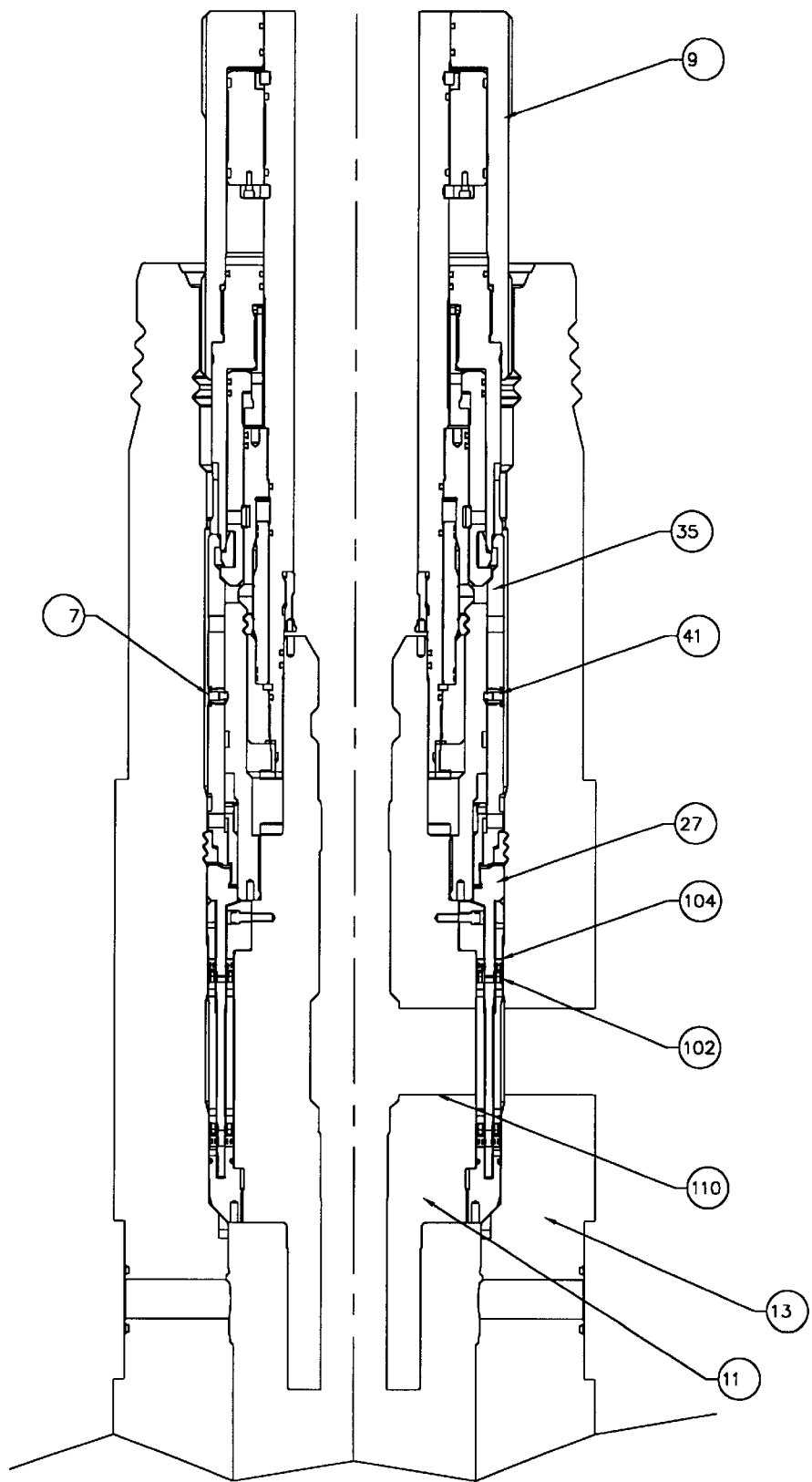
FIG. 5 is a cross-sectional view of the tubing hanger and the tree stalk with the novel invention attached.

In one method of use as shown in FIG. 5, an operator will lower the running tool and contact one end of an actuator 35 which is in contact with the tapered profile 77 of the slot lock ring 57. An operator then will supply hydraulic fluid pressure to actuator 35, to engage the tapered profile 77. Actuator 35 moves against the inner profile of the slot ring 57, applying pressure outward permitting engagement of the slot lock ring teeth 58 with the grooves 100 of the spool tree. The actuator 35 forces against an actuating mandrel 27 through the slot lock ring assembly. Actuating mandrel in turn facilitates a seal on tree spool item 20. Once the slot lock ring is engaged in tree spool locking grooves 100, all components below the slot lock ring are secured to the tree spool through the slot lock ring.

To unlock the tubular components from the tree spool, the operator will supply hydraulic fluid pressure to the activator 35 to move the activator upward allowing slot ring 57 to retract from engagement with the grooves of the spool tree and retract the actuating mandrel. The operator may then pull the running tool from the subsea. Tubular components below the lock ring may then be removed from the tree spool.

In one method of use, an operator will lower the running tool and contact one end of an actuator 35 which is connected at one end to the teeth 77 of the slot lock ring 57. An operator then will supply hydraulic fluid pressure to actuator 35, to engage the teeth 77. Actuator 35 moves against the inner profile of the slot ring 57, applying pressure outward permitting engagement of the slot lock ring within grooves of the spool tree. The actuator 35 forces against an actuating mandrel 27 through the slot lock ring assembly. Actuating mandrel 27 energizes annular seals 102, which are preferably a KT metal seal, and resilient back upper seal 104, which is preferably H shaped and made from an aluminum bronze carrier surrounding an O ring made from a Teflon coated rubber, such as VITON. Thereby the production bore 110 of the tubing hanger body is sealed from the annular region between the tubing hanger 11 and the spool tree 13. At this point, the tubing hanger will be stationary secured.

Once in the lower position, the operator will supply hydraulic fluid pressure to the activator 35 to move the activator upward allowing slot ring 57 to retract from engagement with the grooves of the spool tree. At the same time, hydraulic fluid pressure will be supplied to unlatch the activator causing the seals to disconnect. The operator may then pull the running tool from the subsea. To withdraw a tubing hanger from the wellhead, the tubing hanger running tool 9 is hydraulically energized to move upward sharing pins 41 and 7 and any others used.

The invention has significant advantages. The actuator member provides a large preload and at the same time simultaneously connects to the bore of a tubing hanger. The slot lock ring locks into a lower position as the actuator 35 is moved straight axially downward. No rotational movement is required to accomplish this locking.

While the invention has been shown in only one of its forms, it should be apparent to those skilled in the art that it is not so limited but it is susceptible to various changes without departing form the scope of the invention.

While the invention has been shown in only one of its forms, it should be apparent to those skilled in the art that it is not so limited but it is susceptible to various changes without departing from the scope of the invention.

What is claimed is:

1. A slot lock ring assembly capable of repeated radial expansion and contraction without sustaining permanent deformation and expansion to a load bearing state comprising:
   a solid metal ring having a toothed profile on one diameter and a tapered actuating profile on the opposite diameter, a top edge and a bottom edge;
   a spaced group of cuts that allow repeated radial expansion and contraction of the solid metal ring without sustaining permanent deformation, wherein the cuts are made in an alternating pattern, of a first cut starting on the top edge followed by a second cut starting on the bottom edge, and each group of cuts is spaced apart 10 to 40 degrees.

2. The slot lock ring assembly of claim 1, wherein the solid metal ring comprises a member of the group: ferrous or non-ferrous metals.

3. The slot lock ring assembly of claim 1, wherein each group of cuts each has between 2 and 10 cuts.

4. The slot lock ring assembly of claim 1, wherein the group of cuts have a width of 0.025 to 0.130 inches.

5. The slot lock ring assembly of claim 4, wherein the group of cuts have a width of 0.050 to 0.070 inches.

6. The slot lock ring assembly of claim 1, wherein the depth of each of said cuts is from 1 to 2 inches.

7. The slot lock ring assembly of claim 6, wherein the depth of each of said cuts is 1.875 inches.

8. The slot lock ring assembly of claim 1, wherein said slot lock ring assembly is used to lock tubular members on a subsea wellhead by expanding by camming after application of a force from an actuator, camming said slot ring into the grooves of a tree spool, activating a connector which then engages seals.

9. The slot lock ring assembly of claim 1, wherein said toothed profile has at least one tooth which is capable of slidingly engaging an actuator to open and close said ring.

* * * * *